United States Patent
Billet et al.

(10) Patent No.: US 8,331,556 B2
(45) Date of Patent: Dec. 11, 2012

(54) ASYMMETRICAL METHOD OF ENCRYPTION OR SIGNATURE VERIFICATION

(75) Inventors: Olivier Billet, Tourrettes sur Loup (FR); Yannick Seurin, Saulx les Chartreux (FR); Jacques Patarin, Versailles (FR)

(73) Assignee: France Telecom, Paris (FR)

( * ) Notice: Subject to any disclaimer, the term of this patent is extended or adjusted under 35 U.S.C. 154(b) by 365 days.

(21) Appl. No.: 12/667,712

(22) PCT Filed: Jun. 30, 2008

(86) PCT No.: PCT/FR2008/051200
§ 371 (c)(1),
(2), (4) Date: Jan. 5, 2010

(87) PCT Pub. No.: WO2009/007626
PCT Pub. Date: Jan. 15, 2009

(65) Prior Publication Data
US 2010/0183147 A1 Jul. 22, 2010

(30) Foreign Application Priority Data
Jul. 6, 2007 (FR) ...................... 07 56328

(51) Int. Cl.
H04K 1/00 (2006.01)
H04L 9/00 (2006.01)
H04L 9/28 (2006.01)
H04L 9/32 (2006.01)

(52) U.S. Cl. .................. 380/28; 713/170; 713/176
(58) Field of Classification Search .................... 380/28; 713/170, 176
See application file for complete search history.

(56) References Cited

U.S. PATENT DOCUMENTS 7,100,051 B1 * 8/2006 Kipnis et al. ............... 713/180
7,961,876 B2 * 6/2011 Ding ........................... 380/30
2008/0013716 A1 * 1/2008 Ding ........................... 380/30
2009/0279693 A1 * 11/2009 Billet et al. .................. 380/28
2009/0319590 A1 * 12/2009 Gilbert et al. ................ 708/250

FOREIGN PATENT DOCUMENTS

EP 1 049 289 A1 11/2000
WO WO 2006/134302 A2 * 12/2006
WO WO 2007/116171 A2 * 10/2007

OTHER PUBLICATIONS

Kipnis et al., "Unbalanced Oil and Vinegar Signature Schemes," Advances in Cryptology—Eurocrypt '99, International Conf. on the Theory and Application of Cryptographic Techniques, Prague, CZ, May 2, 1999, vol. 1592, pp. 206-222 (1999).

* cited by examiner

*Primary Examiner* — Christian LaForgia
(74) *Attorney, Agent, or Firm* — Drinker Biddle & Reath LLP

(57) ABSTRACT

The invention proposes a method and a device for decrypting an encrypted message represented by a sequence C or applying an electronic signature to a sequence C, said sequence C consisting of data belonging to a finite field K=GF(q), where q>1, in which there are processed successive blocks each comprising (n·d) successive data items from the sequence C, where n and d are predetermined integers greater than 1, the processing of such a block including the following steps: applying a predetermined affine invertible transformation $t^{-1}$ to said block; interpreting the resulting block as being formed of n successive elements $(y_1, y_2, \ldots, y_n)$ of an extension $E=GF(q^d)$ of the field K; calculating an n-tuplet $(x_1, x_2, \ldots, x_n)$ of elements of the field E by solving a system f of n predetermined polynomials of the form $$y_k = \sum_{1 \le i \le j \le n} a_k^{(ij)} x_i^{q^{\alpha i}} x_j^{q^{\beta j}} + \sum_{1 \le i \le n} b_k^i x_i^{q^{\gamma i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers; interpreting said n-tuplet $(x_1, x_2, \ldots, x_n)$ as being a new block formed of (n·d) successive elements from the field K; and applying a predetermined affine invertible transformation $s^{-1}$ to said new block.

11 Claims, No Drawings

ASYMMETRICAL METHOD OF ENCRYPTION OR SIGNATURE VERIFICATION

CROSS-REFERENCE TO RELATED APPLICATIONS

This application is the U.S. national phase of the International Patent Application No. PCT/FR2008/051200 filed Jun. 30, 2008, which claims the benefit of French Application No. 0756328 field Jul. 6, 2007, the entire content of which is incorporated herein by reference.

FIELD OF THE INVENTION

The invention relates to the field of cryptography. To be more precise, the invention relates to message encryption and electronic signatures.

BACKGROUND OF THE INVENTION

Message encryption algorithms have been known for a long time, especially block encryption algorithms such as the DES (Data Encryption Standard) algorithm (now obsolete) that uses a 56-bit key, the Triple DES algorithm (made public by IBM in 1999), which uses three such keys, and the AES (Advanced Encryption Standard) algorithm selected in the United States of America in October 2000 by the NIST (National Institute of Standards and Technology), which uses keys comprising 128, 192 or 256 bits.

Most known algorithms are symmetrical algorithms, i.e. algorithms such that the entity that encrypts the message and the entity that decrypts it share the same secret key. Symmetrical algorithms have the drawback that the key must be chosen or communicated from one entity to another securely to prevent an attacker discovering it; given the required key length (at least 128 bits), the precautions that this imposes represent a severe constraint.

Attempts have therefore been made to construct asymmetrical encryption algorithms, i.e. algorithms such that any entity seeking to send an encrypted message to a particular destination can use a public variant of that algorithm that is characteristic of the addressee but such that only the addressee can decrypt the encrypted message; note that, strictly speaking, even the sender of an asymmetrically encrypted message cannot decrypt the encrypted message (it is assumed of course that the sender knows the initial message in clear). Since the encryption algorithm is accessible to all, no security precautions are required in terms of the agreement between the sender of a message and its addressee.

Note further that most asymmetrical algorithms can be used either to encrypt messages or to sign messages, these two protocols being simply the inverses of each other. In other words, for encryption applications the public key is used for encryption and the secret key is used for decryption whereas for electronic signature applications the secret key is used for signing and the public key is used to verify the signature.

In asymmetrical algorithms in which the secret key is a "trap-door" (for example the "unbalanced oil and vinegar" algorithm described below), applying an electronic signature proceeds as follows: on signing a sequence C (which can be a summary of an original document), the signatory uses the same (secret) algorithm as if this sequence C were an encrypted message to be decrypted. Thus a "signature" M obtained in this way is made available to the public, or at least to a signature verifier, at the same time as the original document. To verify this signature M thereafter, the signature verifier applies to the sequence M the same public algorithm as if it were a question of encrypting this sequence M; if the signature is authentic, the signature verifier obtains a sequence identical to the sequence C, i.e. to the original document made available to them or its summary.

The best-known asymmetrical algorithm is undoubtedly the RSA algorithm (for a detailed description of the RSA algorithm see the paper by R. L. Rivest, A. Shamir, and L. M. Adleman entitled "A Method for Obtaining Digital Signatures and Public-key Cryptosystems", Communications of the ACM, volume 21, no. 2, pages 120 to 126, 1978). Also known are algorithms using elliptic curves (see for example the paper by Neal Koblitz entitled "Elliptic-Curve Cryptosystems", Mathematics of Computation, volume 48, pages 203 to 209, 1987, or the paper by V. Miller entitled "Use of Elliptic Curves in Cryptography", CRYPTO 85, 1985). Those algorithms have the drawback of requiring very burdensome calculations.

In the "unbalanced oil and vinegar" scheme proposed by A. Kipnis, J. Patarin, and L. Goubin (see their paper entitled "Unbalanced Oil and Vinegar Signature Schemes", EUROCRYPT 1999, pages 206 to 222), the public key consists in a system of h multivariate quadratic polynomials with n variables $x_1$ to $x_n$, where $n > h > 1$, over a finite field K. These polynomials are therefore of the following form:

$$\sum_{1 \le i \le j \le n} a_k^{(ij)} x_i x_j + \sum_{1 \le i \le n} \beta_k^i x_i + \gamma_k (1 \le k \le h)$$

in which the coefficients $\alpha_k^{(ij)}$, $\beta_k^{(i)}$, and $\gamma_k$ belong to K.

This scheme uses a "trap-door" as a "secret key". This trap-door consists in mixing two types of variables, called "oil" variables and "vinegars" variables, to constitute a system of h multivariate quadratic equations with $n = v + h$ variables, where the integer v denotes the number of vinegar variables and the integer h denotes the number of oil variables. The requirement is that $v > h$; moreover, each polynomial of the system includes all possible mononomials, the coefficients of which are drawn randomly, except for mononomials consisting of the product of two oil variables, which are absent. The trap-door of this method exploits the fact that a linear random system with h equations and h unknowns has a very high probability of having a unique solution. By setting randomly the value of the v vinegar variables, it is possible to solve the resulting linear system in the h oil variables. If, for a given random choice of vinegar variables the resulting system is not invertible, it suffices to effect another random choice of vinegar variables.

To mask the structure from the public, there is applied at the input of the system a change of invertible variables from (v+h) variables to (v+h) variables. The system transformed in this way constitutes the public key, while the change of variables and the original system constitute the secret key.

This scheme has the drawback that it can serve only as a signature algorithm and not as an encryption algorithm. Furthermore, it is ineffective because of the necessity on signing to add to the oil variables (directly associated with the message to be signed) a great number of additional variables (the vinegar variables).

Other known asymmetrical algorithms have been cracked, for example the "C*" algorithm (see the paper by Tsutomu Matsumoto and Hideki Imai entitled "Public Quadratic Polynomial Tuples for Efficient Signature Verification and Message Encryption", Eurocrypt '88, pages 419 to 453).

SUMMARY OF THE INVENTION

Thus the present invention relates firstly to a method of decrypting an encrypted message represented by a sequence C or applying an electronic signature to a sequence C, said sequence C consisting of data belonging to a finite field K=GF(q), where q>1, in which there are processed successive blocks each comprising (n·d) successive data items from the sequence C, where n and d are predetermined integers greater than 1, the processing of such a block including the following steps:

applying a predetermined affine invertible transformation $t^{-1}$ to said block;

interpreting the resulting block as being formed of n successive elements $(y_1, y_2, \ldots, y_n)$ of an extension $E=GF(q^d)$ of the field K;

calculating an n-tuplet $(x_1, x_2, \ldots, x_n)$ of elements of the field E by solving a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers;

interpreting said n-tuplet $(x_1, x_2, \ldots, x_n)$ as being a new block formed of (n·d) successive elements from the field K; and applying a predetermined affine invertible transformation $s^{-1}$ to said new block.

Thus the method of the invention uses a trap-door founded on:

grouping the data of the block to be processed, which consists of (n·d) elements of a field K, for example of (n·d) bits (when q=2) or (n·d) bytes (when q=8), into n sequences of d elements;

identifying each of these sequences of d elements of K with a unique element of an extension (in the Galois field sense) E of degree d of K; and applying $E^n$ to $E^n$ consisting of a secret system f of n polynomials.

Moreover, two affine invertible secret transformations s and t are chosen in a manner that is known in the art; in order to mask the trap-door from the public (and therefore any hacker), these transformations (or their inverses $s^{-1}$ and $t^{-1}$, depending on whether encryption or decryption is to be effected) are applied one at the input and the other at the output. Note that even if the public needs to know the value of the product (n·d) (for example the length of the block to be encrypted), it is not necessary for them to know the values of n and d separately.

The (secret) decryption algorithm uses the "trap-door". According to the invention, the decrypter must therefore be able to solve a system of n equations in n unknowns over the field E. Advantageously, it is now known how to effect this resolution in a reasonable time (unless an excessively high value is chosen for n), in particular by means of resolution methods using Grabner bases (see for example the paper by I. A. Ajwa, Z. Liu, and P. S. Wang entitled "Grabner Bases Algorithm" ICM Technical Reports, Kent State University, Kent, Ohio, USA, February 1995). Each decryption operation then in particular entails calculating the Grabner base associated with the data block to be decrypted.

Secondly, and in a correlated way, the invention relates to a method of encrypting a message represented by a sequence M or verifying an electronic signature represented by a sequence M, said sequence M consisting of data belonging to a finite field K=GF(q), where q>1, in which there are processed successive blocks each comprising (n·d) successive data items from the sequence M, where n and d are predetermined integers greater than 1, the secret construction of the public processing algorithm of such a block including the following steps:

applying a predetermined affine invertible transformation s is to said block;

interpreting the resulting block as being formed of n successive elements $(x_1, x_2, \ldots, x_n)$ of an extension $E=GF(q^d)$ of the field K;

calculating an n-tuplet $(y_1, y_2, \ldots, y_n)$ of elements of the field E by means a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers;

interpreting said n-tuplet $(y_1, y_2, \ldots, y_n)$ as being a new block formed of (n·d) successive elements from the field K; and applying a predetermined affine invertible transformation t to said new block.

The resulting public algorithm constructed in accordance with the invention therefore consists simply in an endomorphism g of $K^{nd}$, i.e. the application (to be precise polynomial application) of (n·d) elements of K to (n·d) elements of K resulting from the composition g=tofos. If the product (n·d) is chosen to be fairly large (preferably by choosing a high value for d), it will advantageously be impossible for a hacker to "crack" this algorithm, i.e. to decrypt in a reasonable time a message encrypted in accordance with the invention. Moreover, such an algorithm advantageously requires only low computation power in the encrypter or the signature verifier.

Thirdly, the invention relates further to a device for encrypting an encrypted message represented by a sequence C or applying an electronic signature of a sequence C, said sequence C consisting of data belonging to a finite field K=GF(q), where q>1, in which there are processed successive blocks each including (n·d) successive data items from the sequence C, where n and d are predetermined integers greater than 1, said device including, for the purposes of processing such a block:

means for applying a predetermined affine invertible transformation $t^{-1}$ to said block;

means for interpreting the resulting block as being formed of n successive elements $(y_1, y_2, \ldots, y_n)$ of an extension $E=GF(q^d)$ of the field K;

means for calculating an n-tuplet $(x_1, x_2, \ldots, x_n)$ of elements from the field E by solving a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers;

means for interpreting said n-tuplet $(x_1, x_2, \ldots, x_n)$ as being a new block formed of (n·d) successive elements from the field K; and means for applying a predetermined affine invertible transformation $s^{-1}$ to said new block.

According to particular features, either of the decryption or signature devices briefly described above can be implemented in an electronic circuit that may, for example, consist of a programmed circuit or a wired logic microchip.

The invention is also directed to non-removable, partly removable or totally removable storage means containing computer program code instructions for executing the steps of any of the encryption, decryption, signature or signature verification methods briefly described above.

Finally, the invention is further directed to a computer program downloadable from a communications network and/or stored on a computer-readable medium and/or executable by a microprocessor. This computer program is noteworthy in that it includes instructions for executing the steps of any of the encryption, decryption, signature, or signature verification methods briefly described above when it is executed on a computer.

The advantages of these devices, data storage means, and computer programs are essentially the same as those of the corresponding methods.

DETAILED DESCRIPTION

Other aspects and advantages of the invention become apparent on reading the following detailed description of particular embodiments given by way of non-limiting example.

The concept of constructing a "public key" in accordance with the invention is described below. In other words, it is shown below how the holder of the secret key can construct the algorithm that will be used by the public to process a block of data for the purposes of encryption or signature verification. Note that the choice of functions or numerical values in the following example is aimed essentially at simplifying the explanation and does not claim to reflect advantageous values for a practical implementation of the invention.

The following parameter values are used: q=2 (thus K=GF(2)={0,1} is the field with two elements), d=2, n=2, and thus n·d=4. The field extension E=GF(4)={0,1, $\alpha,\beta$} is defined using the irreducible polynomial $X^2+X+1$. The pairs of elements of K are then identified with the elements of E (which are also polynomials with coefficients in K) in the following manner:

$(0,0) \leftrightarrow 0$ $(0,1) \leftrightarrow 1$ $(1,0) \leftrightarrow \alpha \leftrightarrow X$ $(1,1) \leftrightarrow \beta \leftrightarrow 1+X$.

The process then continues as follows:

random drawing of a system f of n=2 polynomials with n=2 variables with coefficients in E=GF(4). Since it is the field with 4 elements that is considered, there is no utility in considering powers higher than 3, because in this field any element X satisfies $X^4=X$. An example of such a system is $$\begin{cases} Y_1 = X_1 X_2 + \alpha \cdot X_1^2 + \beta \cdot X_2^2 + X_1 + \beta \\ Y_2 = \beta \cdot X_1 X_2 + X_1^2 + X_2^2 + \alpha \cdot X_2 + 1 \end{cases}$$

random drawing of two affine invertible transformations s and t on $K^4$, for example (linear here for simplicity):

$$s = \begin{pmatrix} 1 & 0 & 0 & 1 \\ 1 & 1 & 1 & 0 \\ 1 & 0 & 1 & 1 \\ 1 & 0 & 1 & 0 \end{pmatrix} \text{ and } t = \begin{pmatrix} 1 & 0 & 1 & 1 \\ 1 & 0 & 0 & 0 \\ 0 & 1 & 1 & 0 \\ 1 & 0 & 0 & 1 \end{pmatrix}.$$

The process for calculating the corresponding public key is as follows. Let $(x_1, x_2, x_3, x_4)$ denote the text to be encrypted or the signature to be verified. The outputs $(y_1, y_2, y_3, y_4)$ are calculated as a function of the data $(x_1, x_2, x_3, x_4)$. First of all:

$$s(x_1, x_2, x_3, x_4) = (x_1+x_4, x_1+x_2+x_3, x_1+x_4, x_1+x_3).$$

To compose by f, it is more convenient to interpret the elements of E as polynomials with coefficients in K. Accordingly, the couple $(x_1+x_4, x_1+x_2+x_3)$ is associated with the polynomial:

$$X_1 = (x_1+x_4)X + (x_1+x_2+x_3).$$

It is then possible to calculate $Y_1$ and $Y_2$ by multiplication of polynomials and reduction modulo $X^2+X+1$.

After a few calculations there is obtained:

$$Y_1 = \begin{pmatrix} x_1x_2 + x_2x_3 + x_2x_4 + \\ x_3x_4 + x_1 + x_2 + x_4 + 1 \end{pmatrix} X + \begin{pmatrix} x_1x_2 + x_2x_3 + x_1x_3 + \\ x_3x_4 + x_1 + x_2 + x_3 + 1 \end{pmatrix}$$

$$Y_2 = \begin{pmatrix} x_1x_2 + x_2x_3 + x_1x_3 + \\ x_3x_4 + x_1 + x_3 \end{pmatrix} X + \begin{pmatrix} x_1x_3 + x_2x_4 + x_2 + \\ x_3 + x_4 + 1 \end{pmatrix}.$$

Interpreting this as elements of K, there is thus obtained:

$$fos(x_1, x_2, x_3, x_4) = \begin{pmatrix} x_1x_2 + x_2x_3 + x_2x_4 + x_3x_4 + x_1 + x_2 + x_4 + 1, \\ x_1x_2 + x_2x_3 + x_1x_3 + x_3x_4 + x_1 + x_2 + x_3 + 1, \\ x_1x_2 + x_2x_3 + x_1x_3 + x_3x_4 + x_1 + x_3, \\ x_1x_3 + x_2x_4 + x_2 + x_3 + x_4 + 1 \end{pmatrix}.$$

It remains only to apply t to this quadruplet to obtain the equations expressing $(y_1, y_2, y_3, y_4)$ as a function of $(x_1, x_2, x_3, x_4)$. There is finally obtained:

$$\begin{cases} y_1 = x_1x_2 + x_2 + 1 \\ y_2 = x_1x_2 + x_2x_3 + x_1x_3 + x_3x_4 + x_1 + x_2 + x_3 + 1 \\ y_3 = x_2 + 1 \\ y_4 = x_1x_2 + x_1x_3 + x_2x_3 + x_3x_4 + x_1 + x_3. \end{cases}$$

As indicated above, the present invention also relates to a data processing system implementing any of the encryption, decryption, signature or signature verification methods described above. This data processing system conventionally includes a central processor unit controlling by signals a memory, an input unit and an output unit.

Moreover, this electronic data processing system can be used to execute a computer program including instructions for executing the encryption, decryption, signature or signature verification method of the invention.

The invention is also directed to a computer program downloadable from a communications network including instructions for executing the steps of an encryption, decryption, signature or signature verification method when it is executed on a computer. This computer program can be stored on a computer-readable medium and can be executable by a microprocessor.

This program can use any programming language and take the form of source code, object code or a code intermediate between source code and object code, such as a partially-compiled form or any other desirable form.

The invention is also directed to a computer-readable information medium containing instructions of a computer program as referred to above.

The information medium can be any entity or device capable of storing the program. For example, the medium can include storage means such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or other means. The program of the invention can in particular be downloaded over an Internet-type network.

Alternatively, the information medium can be an integrated circuit incorporating the program, the circuit being adapted to execute any of the methods of the invention or to be used in their execution.

The invention claimed is:

1. A method for decrypting an encrypted message represented by a sequence C or applying an electronic signature of a sequence C, said sequence C consisting of data belonging to a finite field $K=GF(q)$, where $q>1$, in which there are processed successive blocks each comprising ($n \cdot d$) successive data items from the sequence C, where n and d are predetermined integers greater than 1, the processing of such a block comprising the following steps:

applying a predetermined affine invertible transformation $t^{-1}$ to said block;

interpreting the resulting block as being formed of n successive elements $(y_1, y_2, \ldots, y_n)$ of an extension $E=GF(q^d)$ of the field K;

calculating, using a processor of a device, an n-tuplet $(x_1, x_2, \ldots, x_n)$ of elements of the field E by solving a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers with at least one of these exponents being a positive integer;

interpreting said n-tuplet $(X_1, x_2, \ldots, x_n)$ as being a new block formed of ($n \cdot d$) successive elements from the field K; and applying a predetermined affine invertible transformation $s^{-1}$ to said new block.

2. The method according to claim 1, wherein q is equal to 2.

3. The method according to claim 1, wherein q is equal to 8.

4. A method of encrypting a message represented by a sequence M or verifying an electronic signature represented by a sequence M, said sequence M consisting of data belonging to a finite field $K=GF(q)$, where $q>1$, in which there are processed successive blocks each comprising ($n \cdot d$) successive data items from the sequence M, where n and d are predetermined integers greater than 1, the secret construction of the public processing algorithm of such a block comprising the following steps:

applying a predetermined affine invertible transformation s to said block;

interpreting the resulting block as being formed of n successive elements $(x_1, x_2, \ldots, x_n)$ of an extension $E=GF(q^d)$ of the field K;

calculating an n-tuplet $(y_1, y_2, \ldots, y_n)$ of elements of the field E by means a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers with at least one of these exponents being a positive integer;

interpreting said n-tuplet $(y_1, y_2, \ldots, y_n)$ as being a new block formed of ($n \cdot d$) successive elements from the field K; and applying a predetermined affine invertible transformation t to said new block.

5. The method according to claim 4, wherein q is equal to 2.

6. The method according to claim 4, wherein q is equal to 8.

7. A device for decrypting an encrypted message represented by a sequence C or applying an electronic signature of a sequence C, said sequence C consisting of data belonging to a finite field $K=GF(q)$, where $q>1$, in which there are processed successive blocks each including ($n \cdot d$) successive data items from the sequence C, where n and d are predetermined integers greater than 1, said device comprising, for the purposes of processing such a block:

means for applying a predetermined affine invertible transformation $t^{-1}$ to said block;

means for interpreting the resulting block as being formed of n successive elements $(y_1, y_2, \ldots, y_n)$ of an extension $E=GF(q^d)$ of the field K;

means for calculating an n-tuplet $(x_1, x_2, \ldots, x_n)$ of elements from the field E by solving a system f of n predetermined polynomials of the form $$y_k = \sum_{1 \le i \le j \le n} a_k^{(ij)} x_i^{q^{\alpha_i}} x_j^{q^{\beta_j}} + \sum_{1 \le i \le n} b_k^i x_i^{q^{\gamma_i}} + c_k (1 \le k \le n)$$

in which the coefficients $a_k^{(ij)}$, $b_k^{(i)}$, and $c_k$ belong to E and the exponents $\alpha_i$, $\beta_j$, and $\gamma_i$ are positive or zero integers with at least one of these exponents being a positive integer;

means for interpreting said n-tuplet $(x_i, x_2, \ldots, x_n)$ as being a new block formed of ($n \cdot d$) successive elements from the field K; and means for applying a predetermined affine invertible transformation $s^{-1}$ to said new block.

8. The device according to claim 7, wherein q is equal to 2.

9. The device according to claim 7, wherein q is equal to 8.

10. An electronic circuit comprising a decryption or electronic signature verification device according to claim 7.

11. A non-removable, partially removable or totally removable data storage means containing data processing program code instructions for executing the steps of a method according to claim 1.

* * * * *